July 14, 1953  W. A. DE SMIDT  2,645,743
ELECTRICAL SWITCH MOUNTING ENCLOSURE
Filed April 14, 1950  5 Sheets-Sheet 1

INVENTOR.
Woodrow A. de Smidt
BY
David G. Fox
Attorney

July 14, 1953 W. A. DE SMIDT 2,645,743
ELECTRICAL SWITCH MOUNTING ENCLOSURE
Filed April 14, 1950 5 Sheets-Sheet 2

INVENTOR.
Woodrow A. DeSmidt
BY
David G. Fox
Attorney

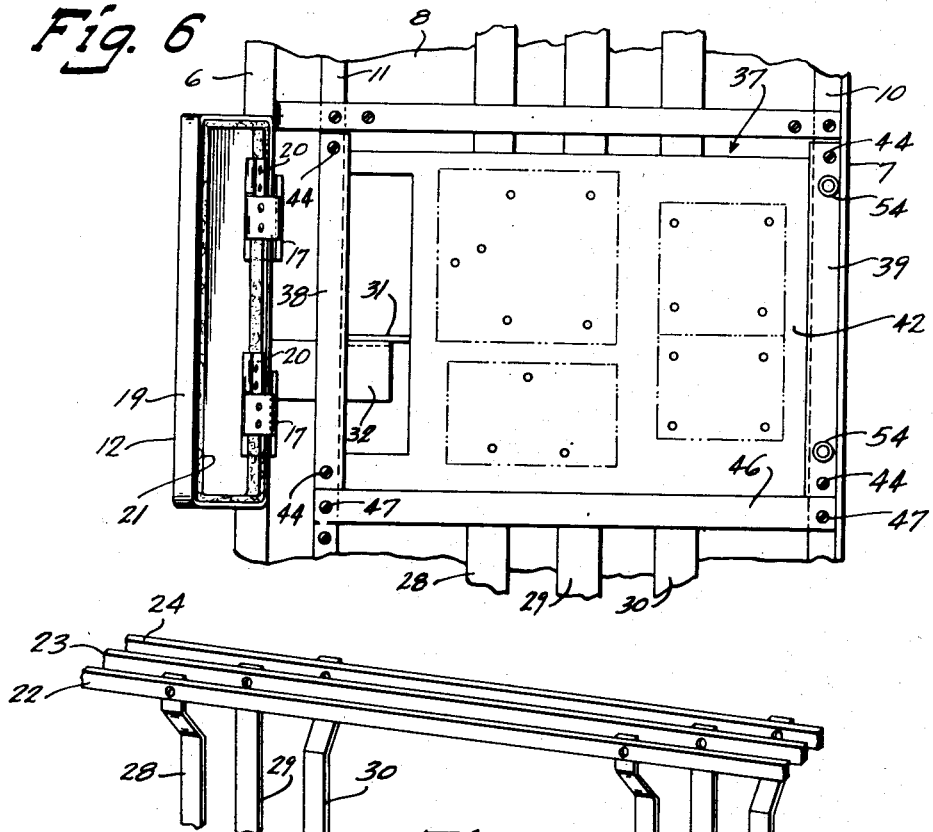
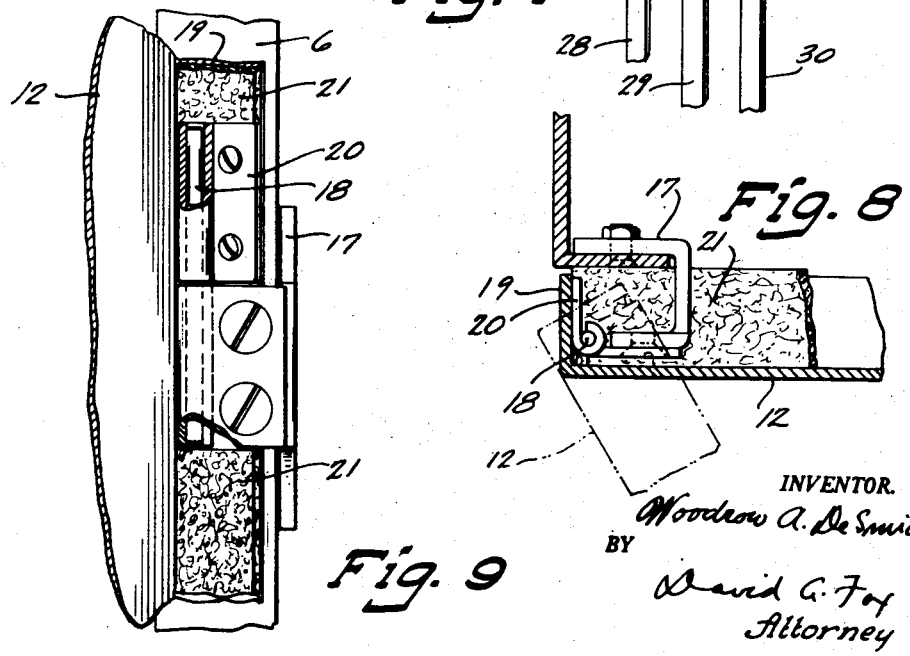

July 14, 1953 W. A. DE SMIDT 2,645,743
ELECTRICAL SWITCH MOUNTING ENCLOSURE
Filed April 14, 1950 5 Sheets-Sheet 4
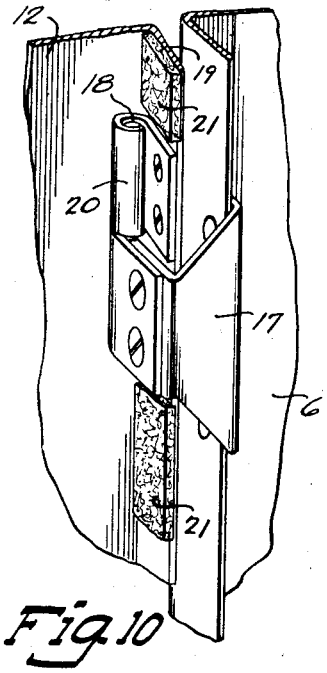
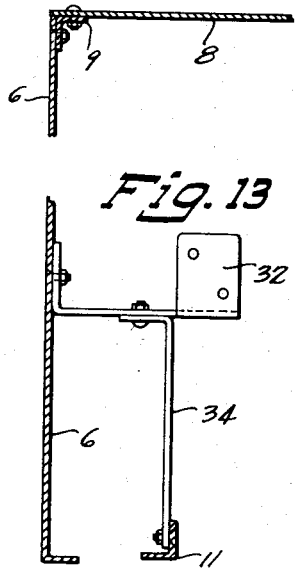
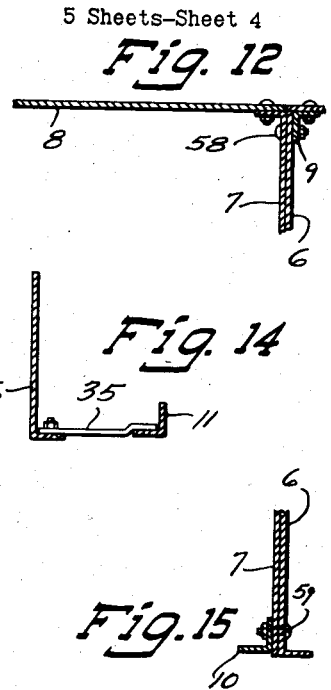
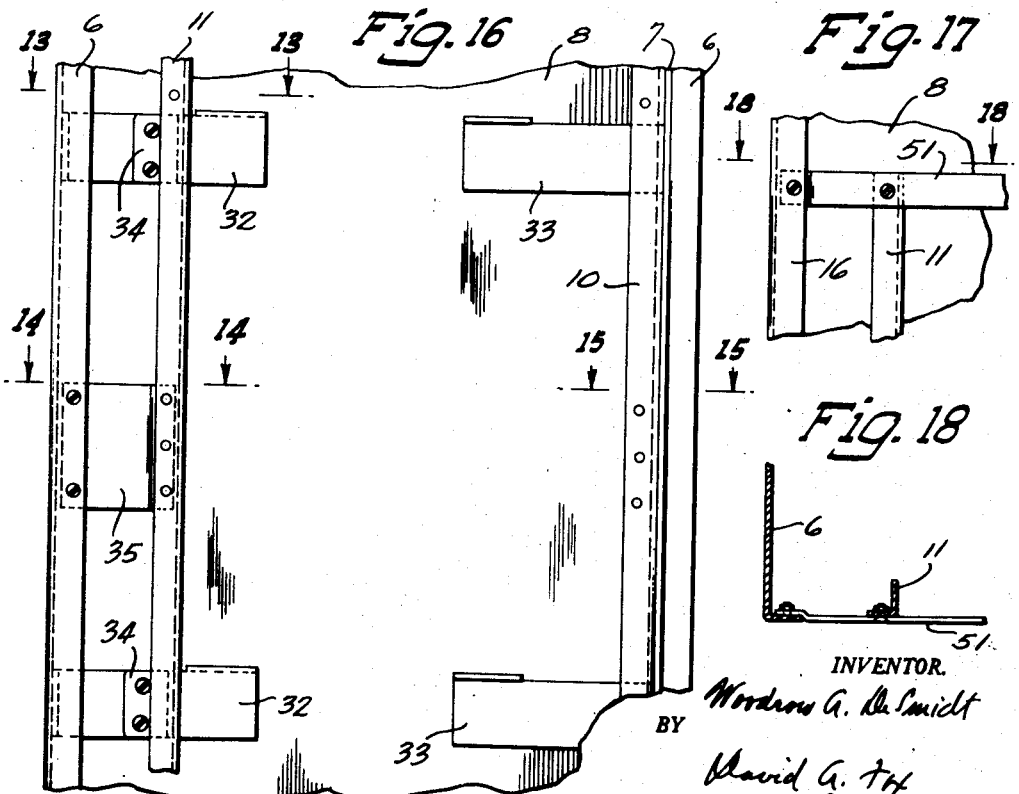
INVENTOR.
Woodrow A. De Smidt
BY
David G. H.
Attorney

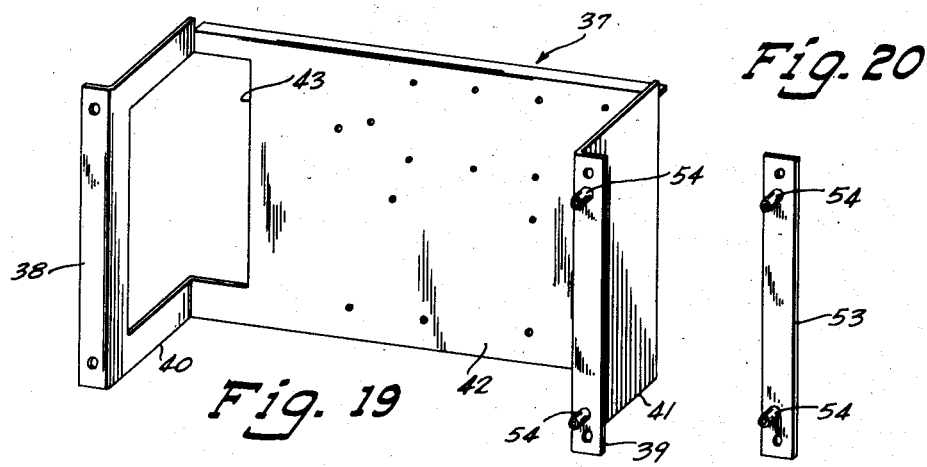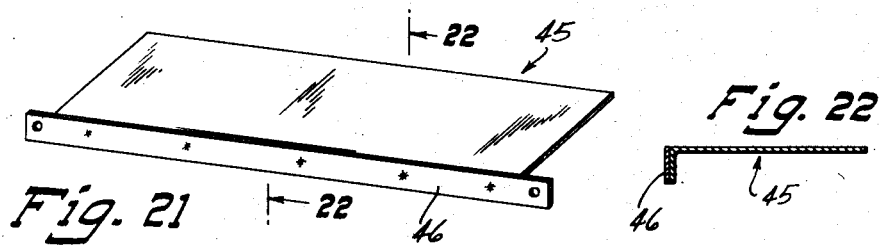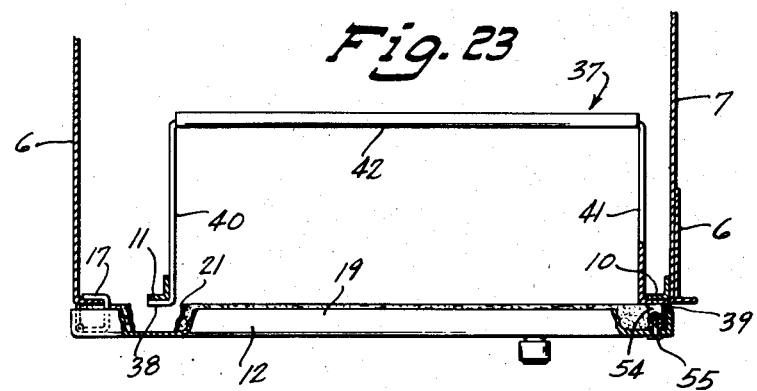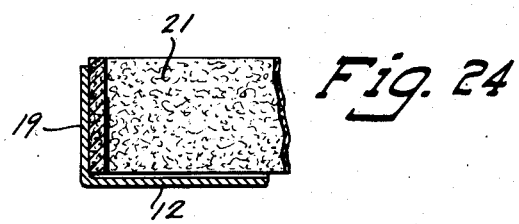

Patented July 14, 1953

2,645,743

UNITED STATES PATENT OFFICE 2,645,743

ELECTRICAL SWITCH MOUNTING
ENCLOSURE

Woodrow A. De Smidt, Whitefish Bay, Wis., assignor to Allen-Bradley Company, Milwaukee, Wis., a corporation of Wisconsin Application April 14, 1950, Serial No. 155,991

2 Claims. (Cl. 317—117)

This invention relates to mounting enclosures for electrical switching and control instrumentalities, and it resides more particularly in an elongated, vertical cabinet having a series of vertically ranged door closures providing a plurality of separately accessible, protective enclosures for a plurality of electrical instrumentalities; said enclosures enveloping a permanent, common, vertically extending, skeletal support upon which independent sub-panels are carried for demountably supporting the several electrical instrumentalities independently of and opposite to their respective access doors and adjacent an available set of entrance-mains or buses and to one side of an exit-main and control-lead shaft; said cabinet being adapted for and intended to be used in connected, side-by-side arrangement in multiple with other like cabinets, to provide a systematized, centralized and compacted, separately-accessible, enclosed bank of any desired number of electrical instrumentalities.

Advantages are at times derived from the placement of the switches and other control instrumentalities required for the control and protection of a plurality of motors or other electrical power consuming devices at a centralized location. Such is particularly true where a group of motors is employed in the operation of a process or a large machine.

At times it is also advantageous to control all of the motors in an entire plant or in a division of a plant from a centralized location. Where such centralized control is provided, the employment of a multiplicity of separately housed switches brings about an elaborate concentration of conduiting, and makes necessary the provision of mounting boards which occupy considerable space.

It has been the practice, heretofore, for the purposes of minimizing the space required and the expense involved in providing plurality of separately housed switches, to employ multiple cell cabinets which are adapted to contain the several switches required, and which at the same time serve to enclose the conductors leading to and from the switches, thus dispensing with the need for an elaborate concentration of conduiting. In structures formerly used for this purpose, the compacting achieved, to a considerable extent has been gained at the expense of easy access to the wiring required. In such structures as have heretofore been used, alteration, replacement or repair of some of the wiring connectors is conveniently accomplished only by removal of the particular switch involved as well as all of those directly above or below it and at times even the sub-panels upon which they are mounted and the doors which provide access thereto.

It is an object of this invention to provide a mounting enclosure for centralized multiple-unit electrical controls in which each control unit may be separately mounted, removed and replaced without disturbing other units or removal of doors and in which wiring connections to the several units may be examined, traced, altered and repaired with the several units in place.

The above and other objects and advantages of this invention will appear from the description following which is set forth by reference to the accompanying drawings forming a part hereof and in which there is set forth by way of illustration and not of limitation a specific form in which the apparatus of this invention may be constructed.

For purposes of simplification the terms "unit" or "control unit" are employed herein as referring to any switch, circuit breaker, protective device, metering, measuring or regulating device, or other device electrically useful in connection with the operation or control of an electrical instrumentality and which may require mounting and protective enclosure.

Figure 1:
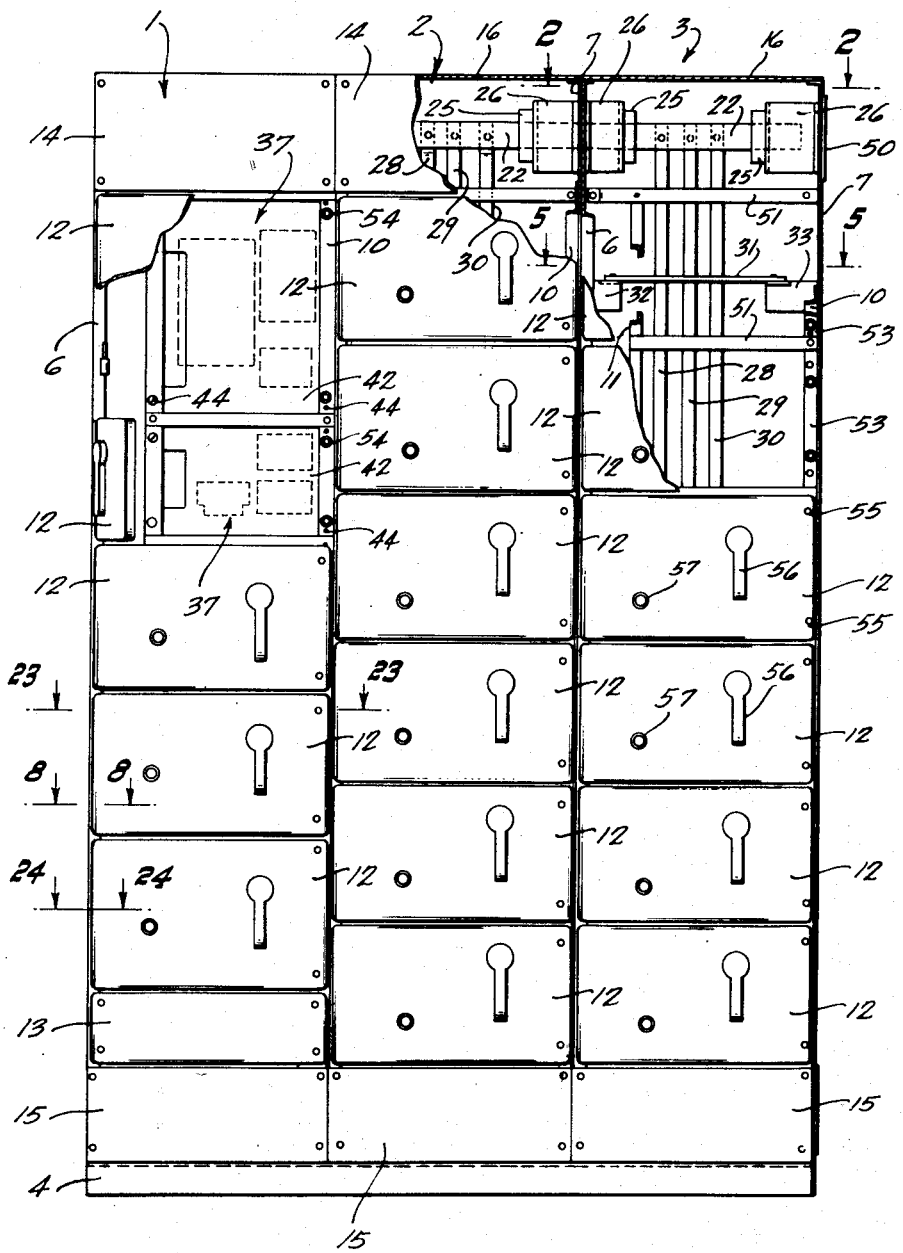
Fig. 1 is a front view in elevation, with parts broken away, of three of the cabinets of this invention assembled in multiple to provide a centralized control arrangement for a plurality of control units.
Figure 2:
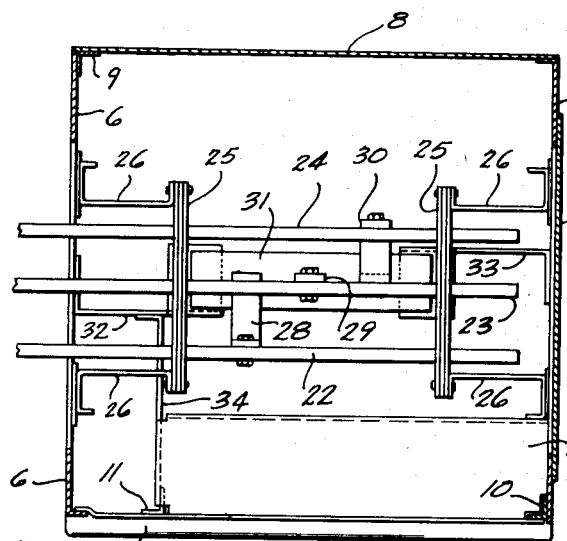
Fig. 2 is a top plan view in section viewed through the plane 2—2 indicated in Fig. 1 of the right hand cabinet shown in Fig. 1 separated from the other cabinets.
Figure 3:
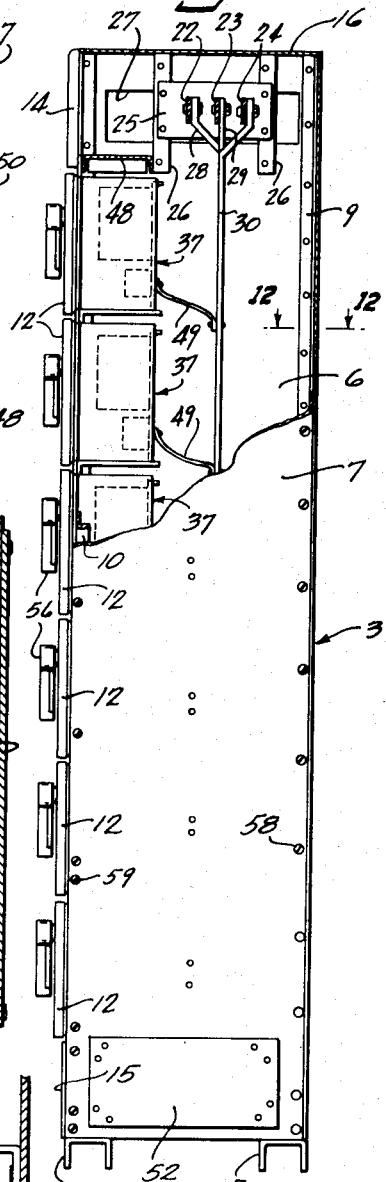
Figure 4:
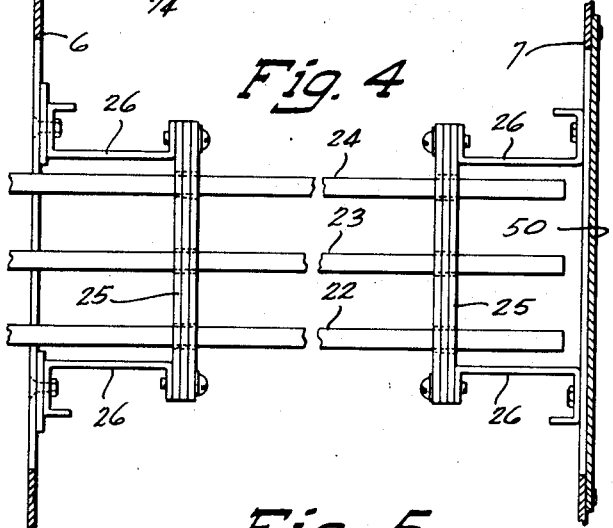
Figure 5:
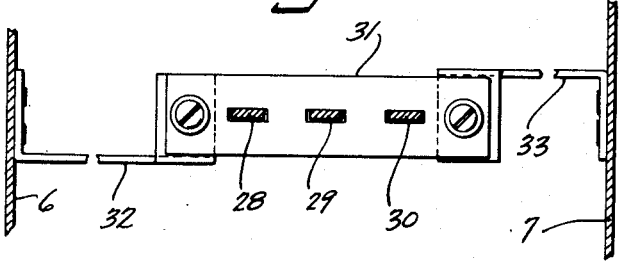

Fig. 3 is a right hand end view in elevation of the apparatus shown in Fig. 1 with parts broken away and in section, Fig. 4 is an enlarged detailed fragmentary top plan view in section showing in greater detail the horizotal bus supports appearing in Fig. 2, Fig. 5 is an enlarged detailed fragmentary top plan view in section viewed through the plane 5—5 of Fig. 1 showing in greater detail the vertical bus supports, Fig. 6 is a fragmentary enlarged detailed front view in elevation of one cell of one of the cabinets shown in Fig. 1 with the door of the same fully open, Fig. 7 is a fragmentary perspective view of the horizontal and vertical buses employed in the apparatus shown in Fig. 1 the same being shown apart from associated structure, Fig. 8 is an enlarged fragmentary top plan view in section of the hinge mounting of a door viewed through the plane 8—8 indicated in Fig. 1, Fig. 9 is a fragmentary front view in elevation of one of the hinges appearing in Fig. 6 on an enlarged scale to clarify the detail thereof, Fig. 10 is a fragmentary perspective detailed view of the hinge appearing in Fig. 9, Fig. 11 is an enlarged detailed fragmentary top plan view in section of the left hand rear corner of the apparatus shown in Fig. 1, Fig. 12 is an enlarged detailed fragmentary top plan view in section of the junction at the rear of the right hand and central cabinets of the apparatus shown in Figs. 1 and 2 viewed through the plane 12—12 indicated in Fig. 3, Fig. 13 is an enlarged detailed fragmentary top plan view as the same appears when viewed through the plane 13—13 indicated in Fig. 16, Fig. 14 is an enlarged detailed fragmentary top plan view as the same appears when viewed through the plane 14—14 indicated in Fig. 16, Fig. 15 is an enlarged detailed fragmentary top plan view as the same appears when viewed through the plane 15—15 indicated in Fig. 16, Fig. 16 is an enlarged detailed fragmentary front view in elevation of a portion of the left hand cabinet of the apparatus shown in Fig. 1 as the same appears with doors and hinges removed, Fig. 17 is an enlarged detailed fragmentary front view in elevation at the level of the top of the upper door in left hand front part of a cabinet shown in Fig. 1, the same being shown as the same appears with the door and heading closure removed, Fig. 18 is an enlarged detailed fragmentary top plan view in section as viewed through the plane 18—18 indicated in Fig. 17, Fig. 19 is a detailed perspective view of one of the sub-panels shown mounted in the apparatus shown in Figs. 1 and 2, Fig. 20 is a detailed perspective of a filler member for use in completing the enclosure of the apparatus shown in Fig. 1 when a sub-panel is omitted, Fig. 21 is a detailed perspective view of one of the sub-panel floors shown mounted in the apparatus shown in Figs. 1 to 3, Fig. 22 is an end view in elevation and in section of the panel floor shown in Fig. 21 viewed through the plane 22—22 there indicated, Fig. 23 is an enlarged detailed fragmentary top plan view with parts broken away and in section of the front of one of the cabinets shown in Fig. 1 viewed through the plane 23—23 there indicated showing the mounting of a sub-panel and its relationship to a door, and Fig. 24 is an enlarged detailed fragmentary top plan view in section viewed through the plane 24—24 indicated in Fig. 1 showing the felt sealing strip attached to the door.

The mounting enclosure for electrical control units of this invention is shown in the drawings as being made up of three vertically elongated similar cabinets generally designated respectively by the numerals 1, 2 and 3 joined side-by-side and mounted on common supporting channels 4 and 5. Each of the several cabinets 1, 2 and 3 is made up of side wrapper sheets 6 and 7 and a rear wrapper sheet 8 which are joined together and secured to an internal skeletal frame. The internal skeletal frame comprises a rear corner angle member 9 and a front corner angle member 10, the same being diagonally disposed with respect to one another. In addition the skeletal frame includes an intermediate front angle member 11 extending vertically in parallel relationship to the angle member 10 but in a position nearer to the front edge of side wrapper 6.

The skeletal frame members 9 and 10 are joined with the respective wrapper members by fastening means as is shown more clearly in Figs. 3 and 11 to 15 inclusive, thus providing a stiffening or re-enforcing skeleton, serving to preserve the rigidity of the cabinet.

The fronts of the several cabinets 1, 2 and 3 are closed by doors 12 or 13 which are of uniform width extending between the side wrappers 6 and 7 and of such vertical dimension as occasion may require. The upper portion of the fronts of the cabinets 1, 2 and 3 are closed by permanent closures 14 and the lower portions by permanent closures 15. The top of the cabinets are provided with cover plates 16.

The several doors 12 are hingedly mounted on the front inwardly turned flanges of the side wrapper sheets 6 so as to derive their hinge support directly from the wrapper members rather than the skeletal frame. As appears more clearly in Figs. 8 to 10, the hinge mounting is provided by hinge brackets 17 which extend first forwardly and then laterally so as to rigidly hold stationary pintles 18 in vertical position near to the front left hand corners of the rectangular doors 12. The doors 12 are provided with inwardly turned stiffening rims 19 to the inner faces of which hinge sleeves 20 are secured in position to pivotally engage the pintles 18. By reason of this construction, particularly the forwardly and laterally extending configuration of the brackets 17 the doors 12 may be swung to fully open position, as shown in Figs. 8 to 10, without interference with adjacent doors. The doors 12 also may be easily removed by raising the same and all doors above the same and the closures 14 but not otherwise.

The inner faces of the rims 19 of the doors 12 are lined, as shown, with felt dust-excluding gaskets 21 connected in place so as to project slightly beyond the rims 19, for engagement with the front flange of wrapper member 6 or parts of the skeletal frame as the case may be.

Extending through the tops of the cabinets 1, 2 and 3, and passing through openings 27 provided therefor in the side wrapper members 6 and 7, is a set of horizontal current supply buses 22, 23 and 24. The buses 22, 23 and 24 are held in place by means of two insulating bushings 25, situated in each of the cabinets which bushings are in turn held in place by stand-off brackets 26 as shown more clearly in Figs. 2, 3 and 4. The bushings 25 are in the form of flat rectangular plates each having three rectangular holes passing therethrough to admit and hold the buses passing therethrough in properly spaced relation. In order to minimize the possibility of mechanical rupture of the bushings 25, by sudden mechanical stress, applied by sudden and heavy electrical overloads, a substantial clearance between the buses and the bushing, as indicated by dotted lines in Fig. 4, is provided.

Extending downwardly vertically substantially through the centers of the cabinets 1, 2 and 3 are sets of distribution buses 28, 29 and 30, the same being joined at their tops respectively with the buses 22, 23 and 24 as appears more clearly in Fig. 7. The buses 28, 29 and 30 are mechanically suspended from the buses 22, 23 and 24 and are held in position laterally by insulating bushings 31 secured to the wrapper members 6 and 7 by brackets 32 and 33 as more clearly appears in Fig. 5.

The brackets 32 are additionally braced by braces 34 appearing more clearly in Figs. 13 and 16 which extend to the intermediate vertical front angle member 11. The brackets 32 and braces 34 and the opposite face of the wrapper member 6 define the walls of an uninterrupted wiring shaft extending vertically throughout each of the cabinets 1, 2 and 3 which shaft is accessible substantially throughout from the front when doors 12 are open. If desired, in order to furnish additional stiffness to the intermediate vertical member 11, braces 35, as appears in Fig. 16, may be interposed without materially interfering with the accessibility of the vertical wiring shaft above referred to.

For the actual mounting of control units within the cabinets 1, 2 and 3, standardized sub-panels generally designated by the numeral 37 of uniform width and U-shaped configuration are provided. As appears more clearly in Fig. 19, the sub-panels 37 are provided with front mounting flanges 38 and 39 from which legs 40 and 41 extend rearwardly to support the main mounting face 42. The mounting face 42 is punched as shown to accommodate fastening means for holding in place such switches, control devices or protective units as may be desired, the same being indicated in outline by broken lines in Figs. 1 and 6. The leg 40 and the left hand part of mounting face 42 are cut away to provide an access opening 43 through which wires may extend from the units mounted on the panels 37 into the wiring shaft between the member 11 and the wrapper 6 and to the buses 28, 29 and 30.

The mounting panels 37, as stated above, are of uniform width, the lateral dimension of the same being such as to bring the mounting flanges 38 and 39 into alignment with the vertical angle members 10 and 11 for attachment thereto as appears more clearly in Figs. 1 and 6. The panels 37 and such units as may be mounted thereon may thus be easily removed, replaced or exchanged with others in the same or a similar cabinet by the simple removal of the fastening screws 44. For the purpose of providing a floor between the sub-panels 37, shelf members 45 having front mounting flanges 46 are provided which are held in place as shown in Fig. 6 by fastening means 47.

At the tops of the cabinets 1, 2 and 3, near the lower margin of the permanent closures 14, shelf members 48 are interposed to define the bottom of an auxiliary wiring duct passing between the several cabinets 1, 2 and 3 through the front ends of the openings 27. This auxiliary horizontal wiring duct is closed on the top by the top member 16, on the front by the permanent closures 14, on the bottom by the shelf members 48 and on the rear, in part, by the brackets 26. The duct thus defined also intersects each of the horizontal wiring shafts extending vertically downwardly therefrom through the several cabinets. Control units mounted on the several panels 37 thus may derive power supply from the buses 38, 39 and 40 through branch connections 49 which power can be extended thence from the control units through wiring which passes into the vertical wiring shaft thence upward into and through the duct extending horizontally across the tops of the cabinets 1, 2 and 3 to conduits entering through a cover plate 50 or similar opening at either side of an assembled row of cabinets.

The shelf members 48 are supported in the position shown, in part, by a transverse member 51 extending from vertical angle 10 to the front flange of wrapper 6. A similar cross brace 51 may be employed whenever a panel 37 is omitted from a space available therefor for any reason as is shown to be the case in the upper right hand part of Fig. 1. In such instances a filler piece 53 as is illustrated in Fig. 20 is secured to the vertical angle 10 in lieu of the flange 39 of the omitted panel 37. The filler 53 serves to mount threaded sleeves 54 which are positioned to be engaged by screws 55 which pass through the right hand margins of the doors 12 to hold the same securely closed. Similar sleeves 54, performing the same function, are secured to the flanges 39 of the panels 37.

If desired, the control and power leads extending from the control units may be extended downwardly into lower parts of the cabinets 1, 2 and 3 using for this purpose the vertical wiring shaft above referred to and from thence may be extended horizontally across the bottoms of the cabinets through openings provided therefor but not shown to a junction with conduits arranged to enter through the cover plates 52.

If, for any reason, manual actuation of control units situated behind the doors 12 is desired, operating handles of well known form such as those shown at 56 or push buttons such as shown at 57 may be provided.

As indicated more clearly in Figs. 12 and 15, adjacent cabinets, disposed in side-by-side arrangement, may be joined by fastening means such as are indicated at 58 and 59. Cabinets such as 1, 2 and 3, being of uniform dimension, may thus be assembled in multiple in any number desired to provide spaces for the accommodation of such number of sub-panels 37 as any particular installation may require.

As appears in the upper left hand corner of Fig. 1, sub-panels 37 of greater or lesser vertical height and correspondingly proportioned doors may be assembled within the cabinets. In this way control units of different size and capacity may be readily installed without any modification of the main structural part of the cabinet. Inasmuch as the subpanels 37 are of lesser width than the front of the cabinet and are mounted entirely upon the skeletal frame members rather than upon the wrapper members enclosing the cabinet, removal and replacement of sub-panels 37 is facilitated inasmuch as it is not necessary to disturb the doors 12 for this purpose. At the same time wiring shafts segregated from the power buses are set apart in positions easily accessible from the front of the cabinet.

I claim:

1. In a mounting enclosure for electrical switching and control instrumentalities, the combination comprising a cabinet having an open front and side and rear wrapper sheets; a vertically extending skeletal re-enforcing frame enclosed by said wrapper sheets including at least one vertical skeletal member disposed parallel to and at a point intermediate between said side wrapper sheets in the front of said cabinet, nearer one of said wrapper sheets to provide a narrower vertical wiring shaft portion and a wider sub-panel mounting portion, said wiring shaft portion being in substantial part open and accessible from the front of said cabinet; a plurality of independent sub-panels mounted in successive vertical sequence in the sub-panel mounting portion of said cabinet, said sub-panels each comprising a main, back, instrumentality-mounting portion disposed rearwardly of the front of said cabinet, with forwardly extending side portions terminating in forward mounting margins secured on one side to said intermediate skeletal member and on the opposite side to the forward margin of the adjacent side wrapper sheet, said forwardly extending sub-panel side portion adjacent said intermediate skeletal member being cut away to provide a wire communication channel between said wiring shaft and the electrical instrumentalities to be mounted on said sub-panel; and a separate access door for each of said sub-panels, disposed in facing and closing relation thereto and to the adjacent wiring shaft portion of said cabinet, said doors being hingedly attached near the forward margin of the side wrapper sheet adjacent the wiring shaft portions of said cabinet; said cabinet being adapted for and intended to be used in connected side-by-side arrangement in multiple with like cabinets.

2. In a mounting enclosure for electrical switching and control instrumentalities, the combination comprising a cabinet having an open front and side and rear wrapper sheets; a vertically extending skeletal re-enforcing frame enclosed by said wrapper sheets including at least one vertical skeletal member disposed parallel to and at a point intermediate between said side wrapper sheets in the front of said cabinet, nearer one of said wrapper sheets to provide a narrower vertical wiring shaft portion and a wider sub-panel mounting portion, said wiring shaft portion being in substantial part open and accessible from the front of said cabinet; a plurality of independent sub-panels mounted in successive vertical sequence in the sub-panel mounting portion of said cabinet, said sub-panels each comprising a main, back, instrumentality-mounting portion disposed rearwardly of the front of said cabinet, with forwardly extending side portions terminating in forward mounting margins secured on one side to said intermediate skeletal member and on the opposite side to the adjacent side wrapper sheet, said forwardly extending sub-panel side portion adjacent said intermediate skeletal member being cut away to provide a wire communication channel between said wiring shaft and the electrical instrumentalities to be mounted on said sub-panel; and a plurality of hinged access doors extending between said side wrapper sheets in closing relation to said wiring shaft and said sub-panel portions of said cabinet.

WOODROW A. DE SMIDT.

References Cited in the file of this patent

UNITED STATES PATENTS

| Number | Name | Date |
|---|---|---|
| 1,203,121 | Laudenschlager | Oct. 31, 1916 |
| 1,487,369 | Berthold | Mar. 18, 1924 |
| 1,930,028 | Adam | Oct. 10, 1933 |
| 1,948,775 | Teller | Feb. 27, 1934 |
| 1,955,237 | Graves | Apr. 17, 1934 |
| 2,319,415 | Lightfoot | May 18, 1943 |
| 2,359,247 | Rowe | Sept. 26, 1944 |
| 2,530,548 | Stanley | Nov. 21, 1950 |
| 2,542,853 | Wills | Feb. 20, 1951 |